(12) United States Patent
Kim et al.

(10) Patent No.: US 6,702,876 B2
(45) Date of Patent: Mar. 9, 2004

(54) ION EXCHANGE SCRUBBER

(75) Inventors: Dong Soo Kim, Ansung-si (KR); Dong Won Kim, Suwon-si (KR)

(73) Assignees: M.A.T. Co., Ltd. (KR); Encoco Co., Ltd. (KR)

( * ) Notice: Subject to any disclaimer, the term of this patent is extended or adjusted under 35 U.S.C. 154(b) by 6 days.

(21) Appl. No.: 10/224,032

(22) Filed: Aug. 20, 2002

(65) Prior Publication Data
US 2003/0213367 A1 Nov. 20, 2003

(30) Foreign Application Priority Data
May 14, 2002 (KR) .................... 2002-0026570

(51) Int. Cl.$^7$ .................... B01D 47/00; B01D 53/81
(52) U.S. Cl. .................... 95/116; 96/122; 96/130; 96/134; 96/141; 96/143; 96/228; 96/240; 96/267; 55/421; 55/428
(58) Field of Search .................... 96/115, 116, 122, 96/130, 134, 139, 141, 143, 154, 228, 234, 240, 267; 55/421, 428; 95/92, 94, 212, 281

(56) References Cited
U.S. PATENT DOCUMENTS

| | | | |
|---|---|---|---|
| 5,226,935 A | * | 7/1993 | Wolff et al. ............. 96/262 |
| 5,772,738 A | * | 6/1998 | Muraoka ............. 96/129 |
| 6,117,211 A | * | 9/2000 | Chan et al. ............. 95/120 |
| 6,214,097 B1 | * | 4/2001 | Laslo ............. 96/236 |

FOREIGN PATENT DOCUMENTS

JP 2002-361030 A * 12/2002

* cited by examiner

*Primary Examiner*—Frank M. Lawrence
(74) *Attorney, Agent, or Firm*—Michaelson & Associates; Peter L. Michaelson; Janet M. Skafar

(57) ABSTRACT

An ion exchange scrubber has a housing, and a partition plate installed within the housing. The partition plate partitions an inner space of the housing in longitudinal direction into two chambers that are filled with a predetermined amount of aqueous solution. The upper end portions of the two partitioned chambers communicate with each other. At least one cartridge is installed at the upper portion and has an ion exchange resin. The ion exchange resin removes a harmful substance contained in the gas. By repeatedly pumping the aqueous solution from one side chamber to the other side chamber, and immersing and cleaning the contaminated ion exchange resin in the aqueous solution, the contaminated gas can be effectively processed even with a small amount of water.

7 Claims, 4 Drawing Sheets

ION EXCHANGE SCRUBBER

BACKGROUND OF THE INVENTION

1. Field of the Invention

The present invention relates to an ion exchange scrubber, and more particularly, to an ion exchange scrubber in which an ion exchange resin is used to remove a harmful substance from a gas, and the contaminated ion exchange resin is cleaned by an aqueous solution and restored, thereby processing the contaminated gas.

2. Description of the Related Art

Conventional gas scrubbers that use water need a large amount of water in order to remove harmful substances contained in the gas. Using a large amount of water is a great burden to the economy of the gas scrubbers. Since conventional gas scrubbers exhaust a large amount of contaminated water, treatment of the contaminated water also acts as a considerable economical burden. In addition, conventional gas scrubbers have a complex structure, and produce a powder of chloride during the removal of the harmful substances from the contaminated gas. The powder clogs the tubes or nozzles of the gas scrubber, which frequently causes problems.

SUMMARY OF THE INVENTION

Accordingly, it is an object of the invention to resolve the aforementioned problems and to provide an ion exchange scrubber in which an ion exchange resin is used to remove a gas. An aqueous solution, which is stored in the scrubber, is used to clean and restore the used scrubber, and significantly reduces the amount of water used. As a result, the ion exchange scrubber has a high gas efficiency and economy.

It is another object of the invention to provide an ion exchange scrubber that is operable without a nozzle, thereby reducing the risk of problems due to the nozzle being clogged.

To accomplish the above objects, the present invention provides an ion exchange scrubber. The ion exchange scrubber has a housing and a partition plate installed within the housing, that partitions an inner space of the housing in a longitudinal direction into two chambers which are filled with a predetermined amount of aqueous solution. Upper end portions of the two partitioned chambers communicate with each other. At least one cartridge is installed in an upper portion and has an ion exchange resin. At least one gas inlet hole is formed in an external plate of the chamber at a position below a position where the cartridge is installed. At least one gas inlet tube is connected to the gas inlet hole. A gas exhaust hole is formed in an upper plate of the housing. At least one introduction/exhaustion hole is formed at a lower portion of the chamber, for supplying or draining the aqueous solution. At least one connection tube connects the introduction/exhaustion holes with each other. At least one level control valve is installed in the at least one connection tube.

The ion exchange resin adsorbs contaminant contained in the gas. By alternately pumping the aqueous solution from one side chamber to the other side chamber and raising the level of the aqueous solution in a chamber, the ion exchange resin is immersed and cleaned in the aqueous solution to desorb the contaminant. Therefore, repetitive use of the ion exchange resin is possible even with a small amount of water.

Furthermore, in another embodiment, a gas scrubber that uses water is connected to the ion exchange scrubber, and the aqueous solution filling the chambers is allowed to circulate and drive the gas scrubber, thereby processing the contaminated gas economically and effectively.

BRIEF DESCRIPTION OF THE DRAWINGS

The above objects and other advantages of the present invention will become more apparent with reference to the following detailed description of the preferred embodiments taken in conjunction with the accompanying drawings in which.

Like reference numerals refer to corresponding parts throughout the drawings.

DETAILED DESCRIPTION OF THE PREFERRED EMBODIMENTS

The preferred embodiments of the present invention will now be described with reference to the accompanying drawings.

Figure 1:
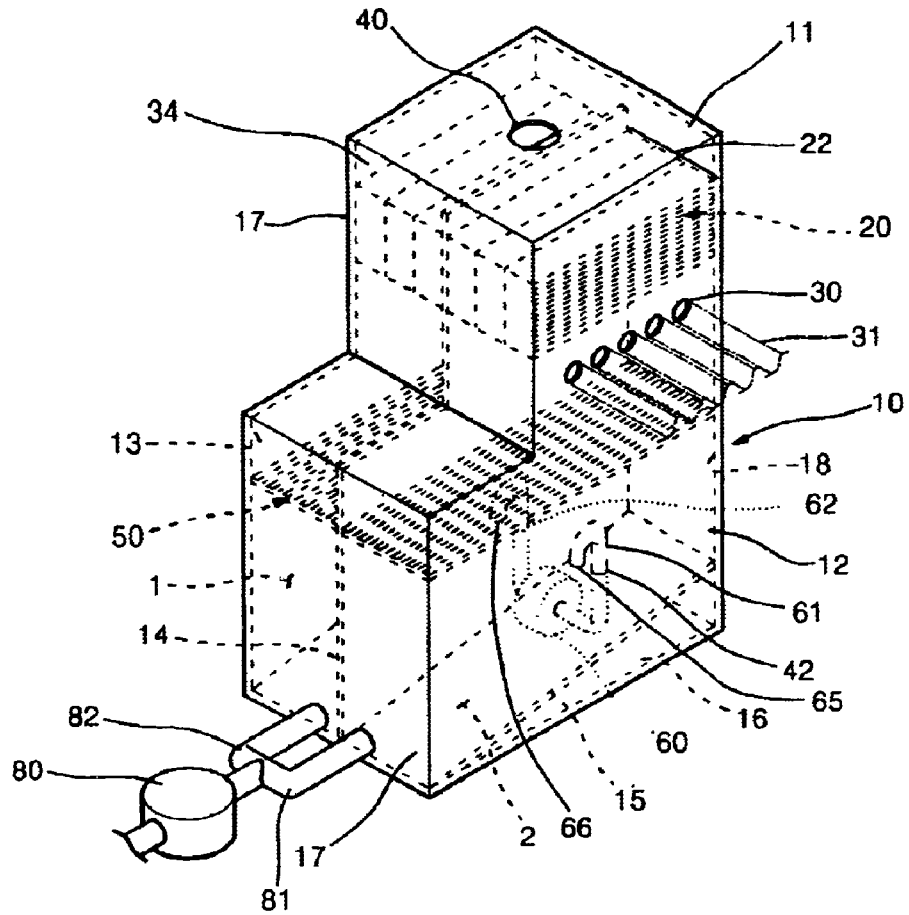
FIG. 1 is a perspective view of an ion exchange scrubber in accordance with a preferred embodiment of the present invention.

As shown in FIG. 1, according to a preferred embodiment of the present invention, a housing 10 has a structure defined by an upper plate 11, a lower plate 16, a front plate 17, a rear plate 18, a left side plate 13 and a right side plate 12. Within the housing 10, there is formed a partition plate 14 that partitions an inner space of the housing into two chambers 1 and 2 in a longitudinal direction. The partition plate 14 is installed such that it is not connected to the upper plate 11 and allows the upper portions of the two chambers 1 and 2 to communicate.

Figure 2A:
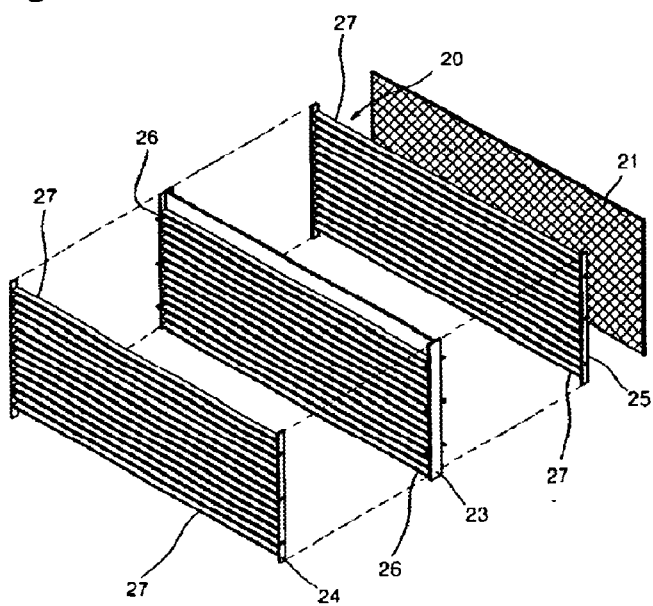
FIG. 2a is a disassembled perspective view of a cartridge in accordance with a preferred embodiment of the present invention.

Referring also to FIG. 2a, a cartridge 20, that has an ion exchange resin 21, is disposed in the upper portion or each chamber 1 and 2. The ion exchange resin 21 is a filter made from a porous material that can filter fluid, by generating radicals using charged ions such that it can exchange cations or anions as needed. The ion exchange resin 21 has various advantages—showing a high adsorption efficiency with respect to contamination substances contained in the gas, maintaining a high removal efficiency during a constant or predetermined time interval, and being usable semipermanently by cleaning with an acidic or basic solution if a large amount of contamination material is adsorbed.

According to one preferred embodiment, as shown in FIG. 2a, the cartridges 20 are longer in a specific direction, and have a central plate 23 with protruded portions 26 that are spaced at a constant or predetermined interval, and two side grills 24 and 25 each having ribs 27 that are also spaced at a constant or predetermined interval. The protruded portions 26 have a predetermined length; and the ribs 27 have a predetermined length. In one embodiment, the protruded portions 26 and the ribs 27 have the same predetermined interval. The ion exchange resin 21 covers at least one of the outer surfaces of the side grills 24 and 25.

Figure 2B:
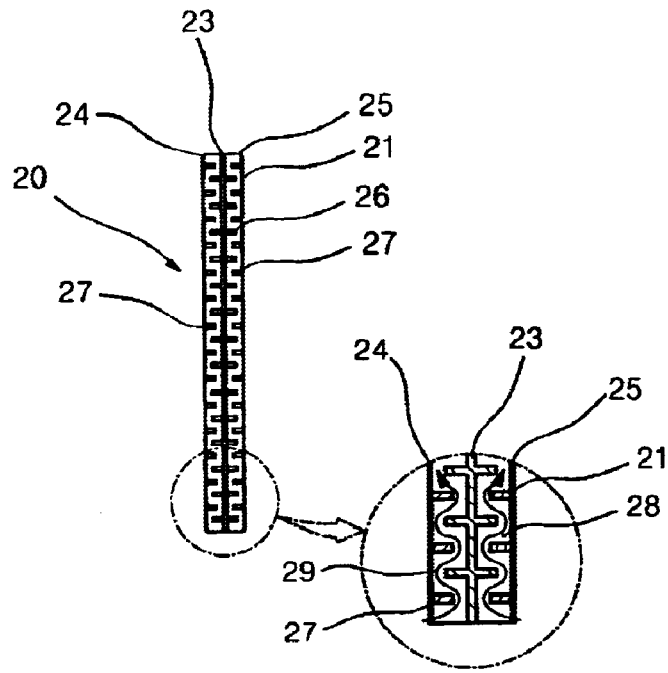
FIG. 2b is a side view of a cartridge in accordance with a preferred embodiment of the present invention and includes a partial detail view for illustrating the flow of gas within the cartridge.

Next, the structure and operation of the cartridge 20 in accordance with a preferred embodiment of the present invention will be described. As shown in FIGS. 2a and 2b, the two side grills 24 and 25 are coupled to both sides of the central plate 23 such that the ribs of the side grills 24 and 25 cross the protruded portions of the central plate 23. As shown in FIG. 2b, a path for gas to flow, shown by arrows 28 and 29, is formed in the cartridge 20. Gas is introduced to the lower portion of the cartridge 20, flows through a zigzag path formed by the central plate 23, the crossed ribs of the side grills 24 and 25 and the ion exchange resin 21, and is exhausted to the upper portion, so that a holding time of the gas within the cartridge 20 increases. Thus, it becomes possible to effectively adsorb harmful substances from the gas.

The ion exchange resin 21 covers the outer surface of the side grills 24 and 25, and utilizes a processed material in which ions are exchangeable. In an embodiment in which several cartridges 20 are arranged adjacent to each other to form a set 22 of cartridges and the set 22 is installed, the ion exchange resin 21 covers one outer surface out of the outer surfaces of the side grills 24 and 25 such that only one sheet of ion exchange resin is arranged between the cartridges 21. In the case of one of the outermost cartridges among the set 22 of overlapped cartridges, the ion exchange resin 21 is installed on both surfaces of the outermost side grill. By doing so, the ion exchange resin is arranged on the outermost two surfaces of the set 22 and between the respective cartridges 20.

Figure 3:
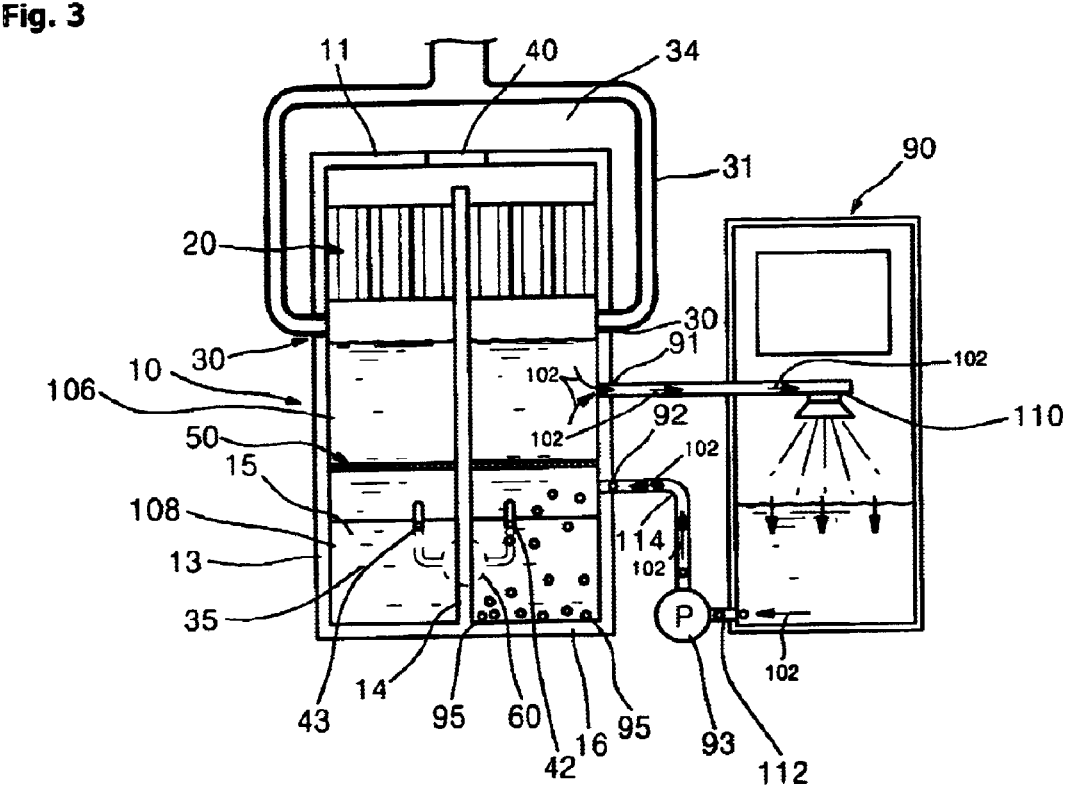
FIG. 3 is a front sectional view of an ion exchange scrubber in accordance with another preferred embodiment of the present invention, and shows a structure in which the ion exchange scrubber is connected with a conventional gas scrubber that uses water.

Referring to FIGS. 1 and 3, gas inlet holes 30 are formed at the left side plate 13 or the right side plate 12 of the housing 10 below a portion where the cartridge is installed. Gas inlet tubes 31 are coupled to the gas inlet holes 30. Contaminant, such as HCl, contained in the introduced gas is adsorbed in the ion exchange resin 21 while the gas is supplied to the lower portion of the cartridge 20 and then flows past the ion exchange resin in the zigzag path formed in the cartridge 20. The processed gas passes a communicating space 34 formed in the upper portion of the housing 10 and is then exhausted to the outside of housing 10 through an exhaust hole 40 formed in the upper plate 11.

As shown in FIGS. 3 to 7, a predetermined amount of aqueous solution 35 is filled in the respective chambers 1 and 2 of the housing 10. Depending on the kind of the contaminant contained in the gas, an acidic solution or basic solution is used. When the contaminant is an acidic substance, for example, HCl or the like, a basic solution containing, for example, $Na_2CO_3$, NaOH, etc., can be used to desorb or wash the contaminant adsorbed in the ion exchange resin 21. When the contaminant is a basic substance, an acidic solution containing $H_2SO_4$ or the like can be used. According to a preferred embodiment of the present invention, as shown in FIG. 1, the housing 10 is constructed such that the lower portion of the housing has a larger volume than the upper portion of the housing where the cartridge is installed, thereby enhancing the capacity of the housing 10 for storing the aqueous solution.

As shown in FIGS. 1 and 3, at the bottom of each of the chambers 1 and 2, there is formed at least one introduction/exhaust hole 42, 43 so as to communicate between the two chambers 1 and 2. In the introduction/exhaust hole 42, 43, connection tubes 61 and 62 connect the introduction/exhaust holes 42, 43 formed in both the chambers 1 and 2. At least one level control pump 60 is disposed between the connection tubes 61 and 62. The level control pump 60 pumps the aqueous solution filled in either chamber 1 or chamber 2 to the other chamber. For this action, at least one bi-directional pump, or alternately at least two unidirectional pumps, can be installed as the level control pump. The pumping can change the level of the aqueous solution filling the respective chambers 1 and 2 in a state where an overall amount of the aqueous solution filling the housing 10 is constant. By pumping the aqueous solution to a chamber and filling it, a cartridge can be immersed in the aqueous solution. By doing so, the ion exchange resin 21 of the cartridges 20 installed in chambers 1 and 2 is alternately immersed in the aqueous solution, thereby desorbing contaminant adsorbed in the ion exchange resin 21 and cleaning the ion exchange resin 21. Thus, by controlling the level of the aqueous solution using the level control pump 60 and thus removing the contaminant from the ion exchange resin 21, there is no need for separate equipment, such as a nozzle. Therefore, the structure of the device is simplified and the risk of problems due to the complexity of the device is reduced.

According to a preferred embodiment of the present invention, as shown in FIG. 1, an incline plate 15 is installed at the lower portion of the housing 10, so that a space is formed between the incline plate 15 and the lower plate 16 of the housing 10. The level control pump 60 is installed within the space. Deposited powder 95 from the cleaning will accumulate on the incline plate 15. End portions of the respective connection tubes 61 and 62 are curved in a hook shape such that the inlets 65 and 66 of the respective connection tubes 61 and 62 are directed toward the lower portion of the incline plate and the deposited powder 95 is not introduced into the connection tubes 61 and 62 and the level control pump 60. The incline plate 15 has another advantage in which powder 95 deposited in the housing 10 is collected below an incline path, that is, at a lower portion, of the incline plate 15.

According to a preferred embodiment of the present invention, in order to drain the aqueous solution to replace the aqueous solution, or to remove the accumulated powder 95 from the lower portion of the chambers 1 and 2, as shown in FIG. 1, a drain pump 80 is connected via pipes 81, 82 to the lower portion of the front plate 17 corresponding to the lower portion of the incline path of the incline plate 15.

According to another preferred embodiment of the present invention, as shown in FIG. 3, a gas scrubber 90 that uses water, hereinafter referred to as a wet gas scrubber, can be connected to the housing 10 and installed. When the wet gas scrubber 90 is used stand-alone, the wet gas scrubber needs a continuous supply of a large volume of water. Both the powder and processing water generated in the gas processing step of the wet gas scrubber 90 also need to be removed continuously. Therefore, a large volume of water and a separate apparatus to process the powder are needed.

However, when the wet gas scrubber 90 is used with the present invention and is connected to the chambers 1 and 2 of the housing 10, the aqueous solution within the chambers 1 and 2 can flow to the wet gas scrubber 90 and circulate, as shown by arrows 102, so that the amount of water used in the wet gas scrubber 90 decreases. Also, the powder, which is generated, together with the processing water, flows into the chambers 1 and 2, thereby eliminating the need for a separate apparatus to process the powder.

In order to perform the above-described operations, the ion exchange scrubber of the present invention has the following structure. As shown in FIG. 3, within the chambers 1 and 2, a filter 50 partitions the inside of the chambers 1 and 2 into an upper portion 106 and a lower portion 108 at a level below the gas inlet hole 30. At either the left side plate 13 or the right side plate 12 of the housing 10, at least one aqueous solution outlet hole 91 is installed at a level above the filter 50 and below the minimum level of the aqueous solution when the level of the aqueous solution in the chambers 1 and 2 is changed by the level control pump 60. At least one aqueous solution inlet hole 92 is installed below the filter 50. The wet gas scrubber 90 is connected to the aqueous solution outlet hole 91 and the aqueous solution inlet hole 92 through tubes 110, 112 and 114 to circulate the aqueous solution within the chambers 1 and 2. According to another preferred embodiment, a circulation pump 93 can be installed in the circulation path of the aqueous solution such that the aqueous solution within the chambers 1 and 2 can circulate through the wet gas scrubber 90. The filter 50 prevents powder contained in the introduced processing water from reaching the upper portion of the chambers 1 and 2 when the level of the processing water introduced from the wet gas scrubber 90 is raised. According to a preferred embodiment of the present invention, one or more wet gas scrubbers 90 can be installed.

In order to restore the processing efficiency of the used ion exchange resin 21 of the cartridge 20, a process for removing contaminant adsorbed in the ion exchange resin 21 will next be described with reference to the accompanying drawings.

The ion exchange resin 21 of the cartridge 20 can maintain a processing effect on the contaminated gas for a considerable amount of time. However, when a large amount of contaminant is adsorbed, a process is needed to periodically desorb the adsorbed contaminant and restore the efficiency of the ion exchange resin 21. According to the preferred embodiment of the invention, the contaminated ion exchange resin 21 is cleaned using an acidic or basic aqueous solution that fills the chambers 1 and 2. The cleaning process is as follows.

Figure 4:
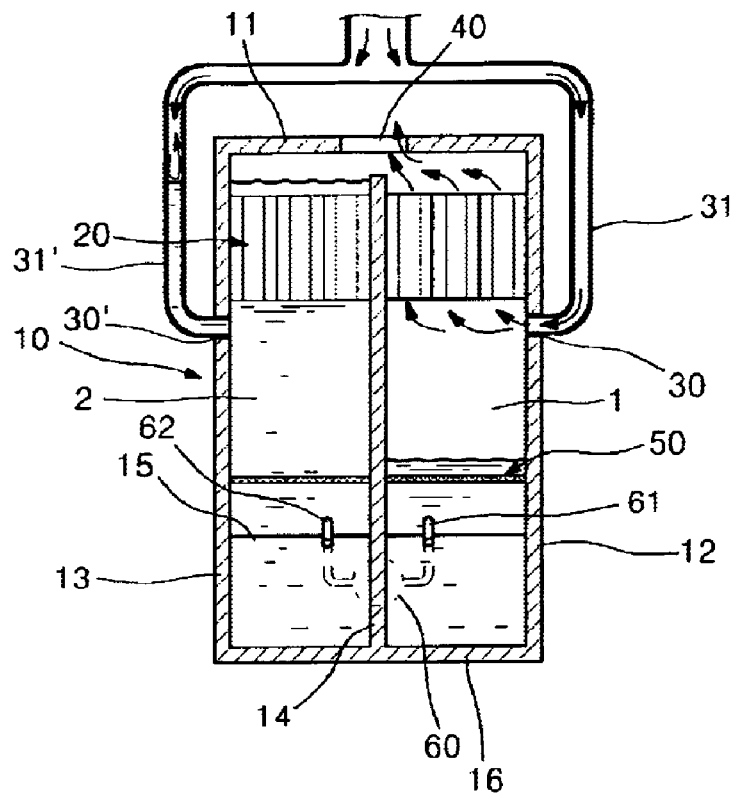
FIGS. 4 to 7 are front sectional views illustrating the operation of the ion exchange scrubber in accordance with a preferred embodiment of the present invention through a process in which the level of the aqueous solution is controlled.

At a first step, in order to form the state shown in FIG. 4, the level control pump 60 pumps the aqueous solution from the right chamber 1 through the right connection tube 61 which connects the introduction/exhaust hole formed in the respective chambers 1 and 2, and drains the aqueous solution through the left connection tube 62. By continuing to pump, the level of the aqueous solution in the right chamber 1 is lowered and the level of the aqueous solution in the left chamber 2 is raised, so that, as shown in FIG. 4, the cartridge 20 in the left chamber 2 is completely immersed in the aqueous solution, and the aqueous solution that overflows the upper portion of the partition plate 14 flows into the right chamber 1. Accordingly, the levels of the aqueous solution in both the chambers 1 and 2 are maintained at a constant levels in the state shown in FIG. 4. At this time, since the cartridge portion of the left chamber 2 is completely immersed in the aqueous solution, the contaminants adsorbed in the ion exchange resin 21 within the cartridge 20 in the left chamber 2 are desorbed by the aqueous solution and that cartridge 20 is cleaned.

Also, as shown in FIG. 4, according to a preferred embodiment of the invention, in the case that the gas inlet tubes 31 and 31' are installed upward from the inlet holes 30 and 30', as the level of the aqueous solution in the left chamber 2 is elevated, the aqueous solution flows into the left gas inlet tube 31' through the left gas inlet hole 30' formed in the left side plate 12, and fills the left gas inlet tube 31' by an amount corresponding to the level of the aqueous solution in the left chamber 2. According to a preferred embodiment of the invention, in case that the gas inlet tube is made in a shape of the letter "T," both ends of the gas inlet tube are connected with the gas inlet holes 30 and 30' of the chambers 1 and 2, respectively, and the gas is supplied through a predetermined portion thereof. The gas cannot be supplied to the left gas inlet tube 31', which is connected to the left chamber 2, while the cartridge 20 is being cleaned since the left gas inlet tube 31' is filled with the aqueous solution. Accordingly, the processing of the contaminated gas is performed only in the cartridge 20 installed in the right chamber 1.

Thus, since the introduction and interception of the gas is automatically carried out by controlling the level of the aqueous solution, the structure of the device is simplified, and therefore reduces the risk of problems due to the complexity of the device.

Figure 5:
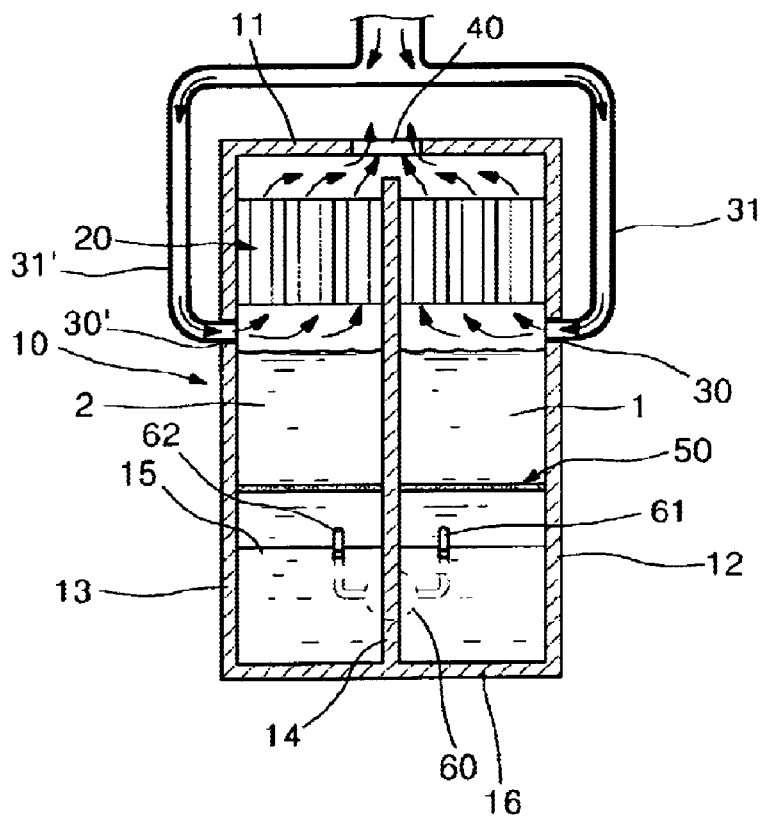

As shown in FIG. 5, at the second step, by stopping the operation of the level control pump 60, the aqueous solution flows through the connection tubes 61 and 62, through which the aqueous solution is supplied or drained, so that the level of the aqueous solution in both the chambers 1 and 2 maintains an equilibrium state. In this step, since the gas can be introduced into both the chambers 1 and 2 through the gas inlet tubes 31 and 31', all the ion exchange resins 21 of the cartridges 20 installed in the chambers 1 and 2 perform the processing of waste gas. According to a preferred embodiment, when it is necessary to drain the aqueous solution through the drain pump 80, shown in FIG. 1, to exchange the aqueous solution, the replacement of the aqueous solution can be performed while the wet gas scrubber of the present invention processes the gas.

Figure 6:
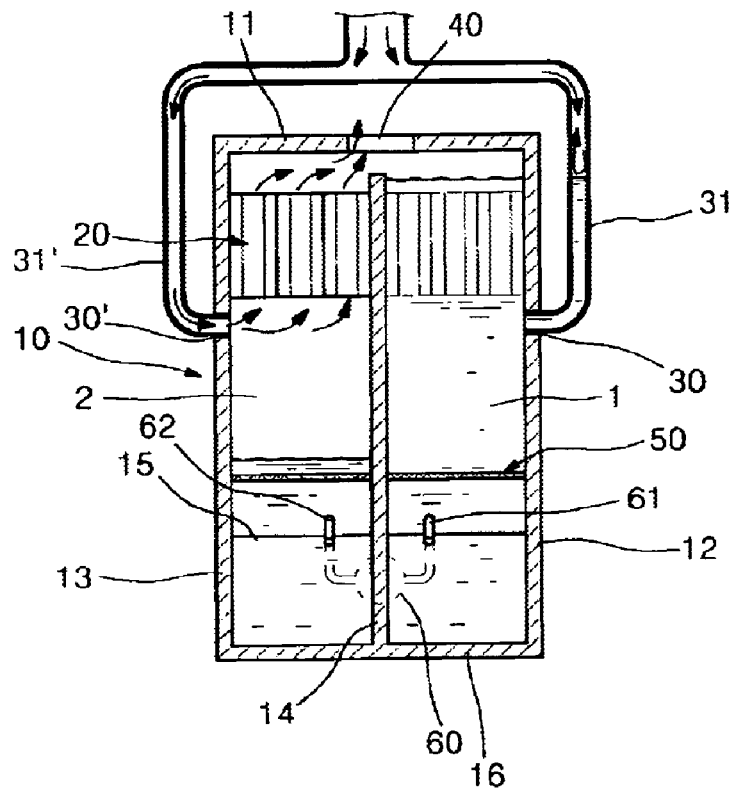

As shown in FIG. 6, at the third step, an operation opposite to the operation of the first step occurs. The level of the aqueous solution in the right chamber 1 is elevated up to the upper end of the partition plate 14, so that the aqueous solution overflows and thus the aqueous solution is introduced into the left chamber 2. However, the left chamber 2 is in the state of the minimum aqueous solution level level. At this time, like the first step, the aqueous solution is filled in the gas inlet tube 31' at a constant height, so that the gas is not introduced into the right chamber 1. Since the contaminant in the ion exchange resin 21 installed within the right chamber 1 is desorbed and cleaned, the efficiency of the ion exchange resin 21 is restored. In this third step, the gas processing step is performed only in the left chamber 2.

Figure 7:
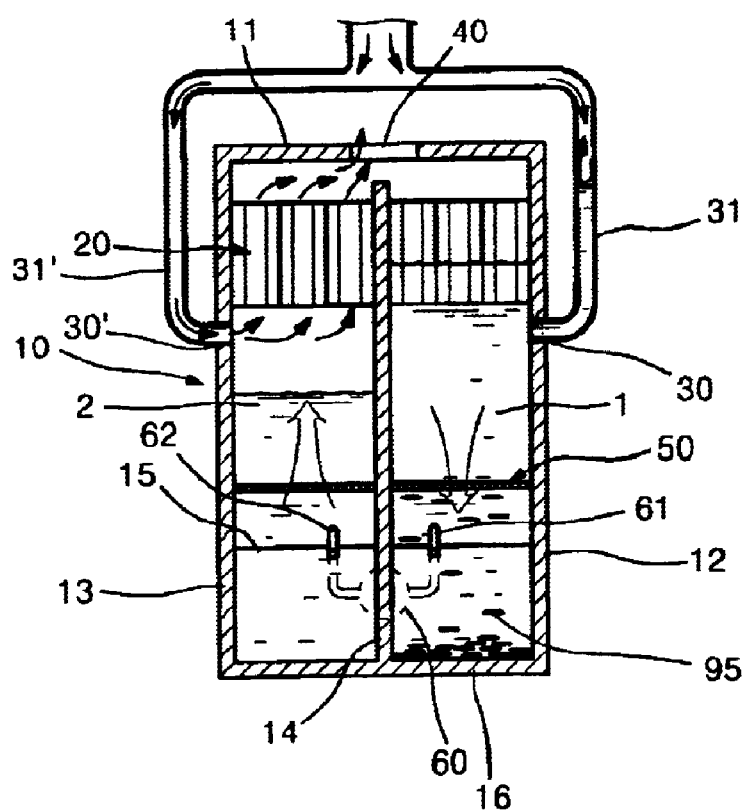

A fourth step is to clean the filter 50 of the ion exchange scrubber of the present invention which may include the wet gas scrubber 90. Like the above, when the aqueous solution is circulated from the wet gas scrubber 90 and powder is introduced into the chambers 1 and 2 together with the aqueous solution, as the level of the aqueous solution in the chambers 1 and 2 is elevated, the aqueous solution is moved up to the chambers 1 and 2 along with the floating powder. At this time, since the filter 50 which is installed in the chambers 1 and 2 filters the powder, the powder is not moved up to the chambers 1 and 2 but becomes attached to the lower portion of the filter 50. As shown in FIG. 7, while the level of the aqueous solution in chamber 1 is reduced below a maximum level, the powder 95 that is attached to the lower surface of the filter 50 is naturally desorbed from the filter 50 and sinks toward the lower portion of the chamber 1, so that the filter is automatically cleaned.

Later, if it becomes necessary to exchange the aqueous solution or to remove the powder, the powder is removed by the drain pump 80 as described above.

As previously described, the ion exchange scrubber having the above structure according to the invention, uses an ion exchange resin that has a high processing efficiency and is semipermanently usable in order to remove contaminant contained in a gas, and alternately cleans the ion exchange resin of the cartridge installed in the respective chambers by controlling the level of the aqueous solution using a level control pump such that a predetermined amount of aqueous solution can be repeatedly used while desorbing the contaminant, so that the amount of water used decreases considerably as compared to a conventional wet gas scrubber. Also, several devices, including nozzles, are eliminated, thereby simplifying the structure of the ion exchange scrubber, reducing the risk of frequent problems and enhancing processing efficiency. In practice, the ion exchange scrubber of the present invention makes it possible to process the gas using an amount of aqueous solution as small as 1/several hundredth of the amount of aqueous solution used by a conventional wet gas scrubber.

Furthermore, in the embodiment in which the ion exchange scrubber of the present invention is used with the conventional wet gas scrubber, the cleaning water that is necessary for the conventional wet gas scrubber circulates as the aqueous solution within the housing of the ion exchange scrubber and is re-supplied to the wet gas scrubber. As a result, the amount of water used is decreased considerably and powder that is generated during the gas removal process is also removed.

While the present invention has been described in detail, it should be understood that various changes, substitutions and alterations could be made hereto without departing from the spirit and scope of the invention as defined by the appended claims.

What is claimed is:

1. An ion exchange scrubber comprising:
   a housing;
   a partition plate installed within the housing and partitioning an inner space of the housing in a longitudinal direction into two chambers filled with a predetermined amount of aqueous solution, upper end portions of the two partitioned chambers communicating with each other;
   at least one cartridge installed at an upper portion and including an ion exchange resin;
   at least one gas inlet hole formed in an external plate of the chamber at a position below a position where the cartridge is installed;
   at least one gas inlet tube connected with the gas inlet hole;
   a gas exhaust hole formed in an upper plate of the housing;
   at least one introduction/exhaustion hole formed at a lower portion of the chamber, for supplying or draining the aqueous solution;
   at least one connection tube for connecting the introduction/exhaustion holes with each other; and
   at least one level control valve installed in the at least one connection tube.

2. The ion exchange scrubber as claimed in claim 1, wherein the cartridge comprises:
   a central plate, having a plurality of protruded portions, the protruded portions having a predetermined length in at least one direction, the protruded portions also being spaced apart at the same interval;
   two side grills each having a plurality of ribs with a predetermined length and being spaced at the same interval as the protruded portions; and
   an ion exchange resin covering at least one outer surface of the two side grills,
   wherein the two side grills are attached at both sides of the central plate such that the plurality of ribs are not directly in contact with the plurality of protruded portions, and the ribs cross the protruded portions.

3. The ion exchange scrubber as claimed in claim 1, wherein the chamber comprises:
   a filter installed at a lower position than the gas inlet hole inside the chambers and partitioning the inner space of the chamber into an upper portion and a lower portion;
   at least one aqueous solution outlet hole installed at a position that is higher than the filter but is lower than a minimum level when the level of the chamber is varied by the level control valve;
   at least one aqueous solution inlet hole formed at a position lower than the filter;
   a gas scrubber device connected with the aqueous solution exhaust hole and the aqueous solution introduction hole through respective tubes, and using the aqueous solution of the chamber as circulation water; and
   a circulation pump installed on a circulation path of the aqueous solution such that the aqueous solution can circulate through the gas scrubber device.

4. The ion exchange scrubber as claimed in claim 1, wherein the housing comprises an incline plate installed at a lower portion within the housing such that the aqueous solution does not penetrate into a space formed below the incline plate, and the level control pump is installed in the space below the incline plate.

5. The ion exchange scrubber as claimed in claim 1 further comprising a drain pump connected with the lower portion of the chamber, for removing powder deposited at the lower portion of the chamber together with the aqueous solution filled in the chamber.

6. The ion exchange scrubber as claimed in claim 1, wherein the lower portion of the housing is larger in volume than the upper portion of the housing where the cartridge is installed.

7. The ion exchange scrubber as claimed in claim 3 further comprising a drain pump connected with the lower portion of the chamber, for removing powder deposited at the lower portion of the chamber together with the aqueous solution filled in the chamber.

* * * * *